United States Patent [19]
Leighton

[11] Patent Number: 5,949,885
[45] Date of Patent: *Sep. 7, 1999

[54] METHOD FOR PROTECTING CONTENT USING WATERMARKING

[76] Inventor: F. Thomson Leighton, 15 Charlesden Park, Newtonville, Mass. 02160

[*] Notice: This patent is subject to a terminal disclaimer.

[21] Appl. No.: 08/920,365

[22] Filed: Aug. 29, 1997

Related U.S. Application Data

[63] Continuation-in-part of application No. 08/615,534, Mar. 12, 1996, Pat. No. 5,664,018.
[51] Int. Cl.$^6$ ................................. G09C 5/00; H04L 9/00
[52] U.S. Cl. ..................................... 380/54; 380/3; 380/4; 380/23; 380/55; 283/73; 283/113; 283/17
[58] Field of Search .............................. 380/3, 4, 23, 49, 380/51, 54, 55, 59; 283/113, 72, 73, 74, 85, 93, 57, 58, 59, 901, 902, 17; 341/51; 348/432

[56] References Cited

U.S. PATENT DOCUMENTS

| | | | |
|---|---|---|---|
| 4,939,515 | 7/1990 | Adelson | 341/51 |
| 5,010,405 | 4/1991 | Schreiber et al. | 348/432 |
| 5,488,664 | 1/1996 | Shamir | 380/54 |
| 5,530,759 | 6/1996 | Braudaway et al. | 380/54 |
| 5,664,018 | 9/1997 | Leighton | 380/54 |

FOREIGN PATENT DOCUMENTS

| | | |
|---|---|---|
| 8908915 | 9/1989 | WIPO . |
| 9514289 | 5/1995 | WIPO . |

OTHER PUBLICATIONS

Bender, W. et al., "Techniques for date hiding," SPIE vol. 2420, pp. 164–172, 1995.

Boland, F. et al., "Watermarking Digital Images for Copyright Protection," IEEE, Edinburgh, pp. 326–330, 1995.

Boneh, D. et al., "Collusion–Secure Fingerprinting for Digital Data," Dept. of Computer Science, Princeton University, Technical Report #486, pp. 1–31, 1995.

Boney, L. et al., "Digital Watermarks for Audio Signals," Dept. of Electrical Engineering, University of Minnesota, pp. 1–21, 1996.

Brassil, J. et al., "Electronic Marking and Identification Techniques to Discourage Document Copying," IEEE, vol. 13, No. 8, pp. 1495–1504. Oct. 1995.

Braudaway, G. et al., "Protecting Publicly–Available Images with a Visible Image Watermark," IBM Research Division, Computer Science/Mathematics, RC 20336 (89918), pp. 1–5, Jan. 15, 1996.

Bruckstein et al., "A Holographic Transform Domain Image Watermarking Method," Bell Laboratories, pp. 1–39, Sep. 1994.

Caronni, Germano, "Assuring Ownership Rights for Digital Images," Proceedings of "reliable IT systems", VIS '95, pp. 1–10, 1995.

(List continued on next page.)

*Primary Examiner*—Bernarr E. Gregory
*Attorney, Agent, or Firm*—David H. Judson

[57] ABSTRACT

A watermarking procedure wherein each of a set of copies of the work has a slightly-modified form of a "baseline" watermark that is placed within a critical region of the data. The slight variations in the watermarks, however, are not perceptually visible and do not interfere with the work. If multiple persons collude to attempt to create an "illicit" copy of the work (i.e., a copy without a watermark), however, at least one of the modified watermarks is present in the copy, thereby identifying both the illicit copy and the copier.

37 Claims, 1 Drawing Sheet

OTHER PUBLICATIONS

Choudhury, A. et al., "Copyright Protection for Electronic Publishing over Computer Networks," IEEE Network Magazine, pp. 1–17, Jun. 1994.

Craver, S. et al., "Can Invisible Watermarks Resolve Rightful Ownerships?" IBM Research Division, RC 20509, Computer Science/Mathematics, Jul. 25, 1996.

Craver, S. et al., "Technical Trials and Legal Tribulations," Communications of the ACM, vol. 41, No. 7, Jul. 1998.

Cox, I. et al., "Secure Spread Spectrum Watermarking for Multimedia," NEC Research Institute, Technical Report 95–10, pp. 1–33, 1995.

Hartung, F. et al., "Digital Watermarking of Raw and Compressed Video," SPIE vol. 2952, pp. 205–213, Apr. 1996.

Low, S. et al., "Document Marking and Identification using Both Line and Word Shifting," AT&T Bell Laboratories, pp. 1–21, Jun. 7, 1994.

Macq, Benoit M., "Cryptology for Digital TV Broadcasting," Proceedings of the IEEE, vol. 83, No. 6, pp. 944–957, Jun. 1995.

Matsui, K. et al., "Video–Steganography: How to Secretly Embed a Signature in a Picture," IMA Intellectual Property Project Proceedings, vol. 1, Issue 1, pp. 187–206, Jan. 1994.

Memon, N. et al., "Protecting Digital Media Content," Communications of the ACM, vol. 41, No. 7, Jul. 1998.

Mintzer, F. et al., "Opportunities for Watermarking Standards," Communications of the ACM, vol. 41, No. 7, Jul. 1998.

O'Ruanaidh, J. et al., "Phase Watermarking of Digital Images," Proceed. of the IEEE Int. Conference on Image Proceesing ICIP–96, pp. 239–242, Lausanne, Switzerland, Sep. 16–19, 1996.

O'Ruanaidh, J. et al., "Rotation, Scale and Translation Invariant Digital Image Watermarking," IEEE, pp. 536–539, 1997.

Pfitzmann, B. et al., "Asymmetric Fingerprinting," Eurocrypt '96, pp. 1–12, May 1996.

Pfitzmann, Birgit, "Trials of Traced Traitors," Workshop on Information Hiding, Cambridge, UK, pp. 1–16, 30.5–1.6. 1996.

Swanson, M. et al., "Data Hiding for Video–in–Video," IEEE, pp. 676–679, Jul. 1997.

Tanaka, K. et al., "Embedding Secret Information into a Dithered Multi–Level Image," IEEE, pp. 216–220, Jun. 1990.

van Schyndel, R. et al., "A Digital Watermark," IEEE, pp. 86–90, 1994.

Yeung, M. et al., "Digital Watermarking," Communications of the ACM, vol. 41, No. 7, Jul. 1998.

Zhao,, J. et al., "In Business Today and Tomorrow," Communications of the ACM, vol. 41, No. 7, Jul. 1998.

5,949,885

METHOD FOR PROTECTING CONTENT USING WATERMARKING

This application is a continuation-in-part of prior application U.S. Ser. No. 08/615,534, filed Mar. 12, 1996, now U.S. Pat. No. 5,664,018.

TECHNICAL FIELD

The present invention relates generally to preventing unlawful copying of audio, video and other media that can be digitized and, more particularly, to improved watermarking techniques that are robust even against multiple individuals who conspire together with independent copies.

BACKGROUND OF THE INVENTION

The proliferation of digitized media (audio, image and video) and the ease with which digital files can be copied has created a need for copyright enforcement schemes. Conventional cryptographic systems permit only valid keyholders access to encrypted data, but once such data is decrypted there is no way to track its reproduction or retransmission. Such schemes thus provide insufficient protection against unauthorized reproduction of information. It is known in the prior art to provide a so-called digital "watermark" on a document to address this problem. A "watermark" is a visible or preferably invisible identification code that is permanently embedded in the data and thus remains present within the data after any decryption process. One example of a digital watermark would be a visible "seal" placed over an image to identify the copyright owner. However, the watermark might also contain additional information, including the identity of the purchaser of a particular copy of the material.

Many schemes have been proposed for watermarking digital data. In a known watermarking procedure, each copy of a document D is varied slightly so as to look the same to the user but also so as to include the identity of the purchaser. The watermark consists of the variations that are unique to each copy. The idea behind such schemes is that the watermark should be hard to remove without destroying the document. Thus, a copy of a watermarked document should be traceable back to the specific version of the original from which it was created.

Although many prior art schemes claim to possess the "unremovable" property, all existing schemes are easily defeated by the following type of attack. Assume the attacker obtains two copies of the document that is being protected by the watermarking scheme. Each copy may have a different watermark, neither of which is supposed to be removable. The attacker now makes a third version of the document (which he hopes will not have a traceable watermark) by averaging his two copies. For a pictorial document, for example, each pixel of the third version would be the average of the corresponding pixels in the watermarked copies.

Using existing approaches to watermarking, the third copy of the document produced by the attacker will look like the original versions but the watermark will be destroyed. This is because the "average" of two watermarks does not carry sufficient information to be tied to either of the watermarks individually. Thus, the watermarking scheme can be rendered ineffective by simply averaging two copies of the document.

There is thus a need to devise a watermarking scheme that is immune to these and other such attacks, especially those in which the adversary obtains multiple copies of the original document.

BRIEF SUMMARY OF THE INVENTION

It is the principal object of the invention to describe a digital watermarking scheme wherein the watermark is robust against collusion by multiple individuals who each possess a watermarked copy of the data.

It is another object to describe such a scheme wherein the watermark cannot be removed by an adversary who obtains multiple copies of the original work.

It is a more general object of the invention to describe a watermarking method that is secure against any form of attack including, without limitation, averaging attacks.

It is still a further object of the invention to describe a watermarking procedure wherein each of a set of copies of the work has a slightly-modified form of a "baseline" watermark that is placed within a critical region of the data. The slight variations in the watermarks, however, are not perceptually visible and do not interfere with the works. If multiple persons collude to attempt to create an "illicit" copy of the work (i.e., a copy without a watermark), however, at least one of the modified watermarks is present in the copy, thereby identifying both the illicit copy and the copier.

It is still thus another object to describe a watermarking scheme of the type recited above wherein combining copies of the same data set does not destroy the watermark.

It is a further object of the invention to describe such a watermarking scheme that may be used to identify one or more of the parties who are colluding to destroy the watermark.

It is another more general object of the invention to describe a digital watermarking process that may be used as evidence in a Court because it is robust against collusion.

According to the preferred embodiment of the invention, the work to be protected is digitized into a data file or string of data. A first digital watermark is then inserted in a first copy of the data file, preferably in a critical region of the data. A "critical" region may consist of the entire document or alternatively will be some valuable portion of the work that will end up being significantly corrupted if the watermark is corrupted. A second digital watermark is then inserted in a second copy of the data file in a similar manner, and the process is repeated for additional copies. According to the invention, the first and second digital watermarks are slight variations of a "baseline" watermark, which is kept secret, and one cannot perceive any differences between the first and second copies due to these variations. The baseline watermark may be a digital string that is part of the original data being protected. Preferably, the variations are "randomized" in such a manner that if two persons were to collude to attempt to create an "illicit" copy of the work (i.e., a copy without a watermark), at least one of the first or second watermarks would still be present in the copy. After the watermark is inserted into the work, the work can be converted back to its original form.

Thus, the scheme ensures that different possessors of watermarked copies of a work cannot create a "clean" copy that does not include at least one of the slightly-modified watermarks. Indeed, by comparing the watermark of the illicit copy with the baseline watermark, one can determine the identity of the forger.

Although not meant to be limiting, preferably the "variations" are generated using a "random" offset, and in particular a "normal distribution."

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
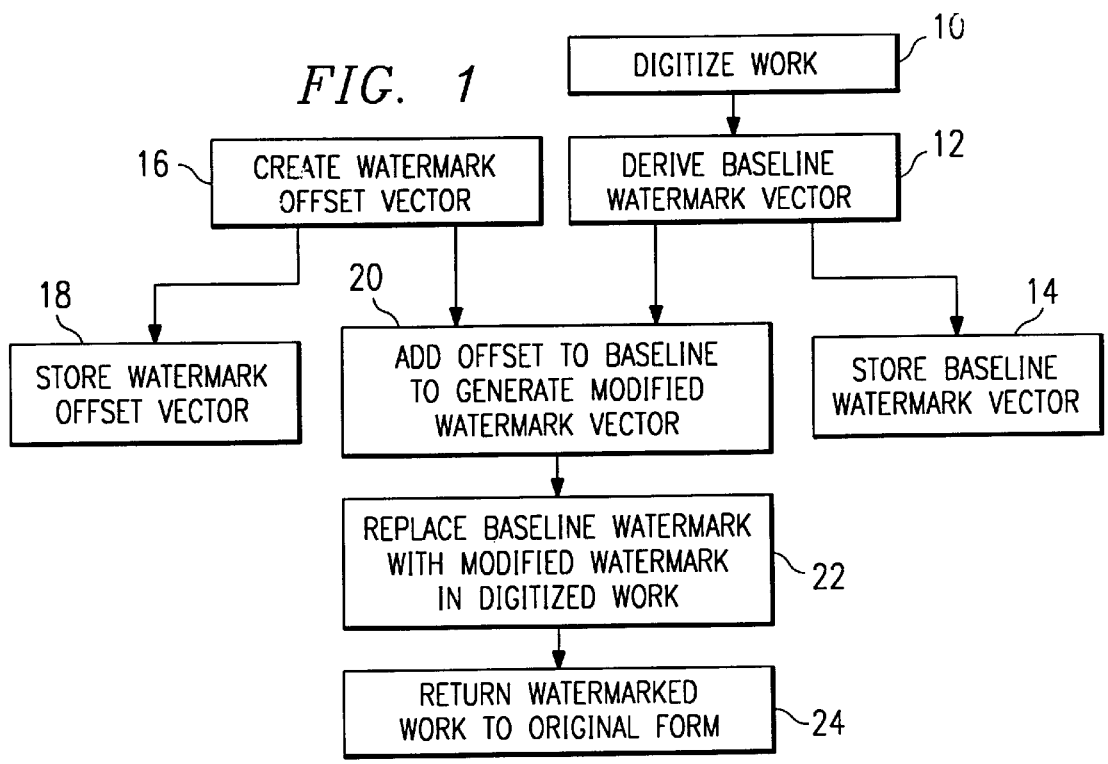
FIG. 1 is a block diagram illustrating the method of inserting a digital watermark into a copy.

According to the invention, the work to be protected may be an image (photographs and graphics), video and/or audio (speech and music). The particular type of work is not relevant to the invention. Referring now to FIG. 1, the work, in whatever form, is digitized at step 10 into a data file or string of data either as part of the inventive technique or through some known A/D preprocessing. In the invention, there is a "baseline" watermark that is preferably stored and not used in making a particular copy of the work (although this step is not necessarily required). This baseline watermark is then processed to create a set of one or more "modified" watermarks, each of which is related to the baseline watermark in a predetermined manner. Preferably, the "offsets" needed to create the modified watermarks are not fixed, however, but are "randomized." In this way, a very small amount of "noise" is added to the offsets that does not alter the perception of the watermarked copies but still ensures that possessors of such copies cannot collude to remove all existence of the watermark in at least one illicit copy.

In general, collusion-type attacks are prevented according to the invention by constructing a watermark using randomness in a specific way. Preferably, an n-length digital string: $x_1, x_2 \ldots, x_n$ is derived at step 12 from the data to be watermarked and stored at step 14 for future reference. This may be referred to as the "baseline" watermark. The string is preferably "critical" to the data in that corruption of the string will corrupt the data in a way that can be perceived and which will diminish the value of the corrupted document. Generation of the baseline watermark can be achieved in many ways, e.g., by digitizing some portion of the document and using the resulting data or some subset thereof. (Whatever method is used is also used in the verification process, as discussed below). An n-length watermark vector $w_1, w_2, \ldots w_n$, is then created at step 16 and stored at step 18 for future reference. The vector is preferably created by choosing each $w_i$ from a specified random distribution (preferably the normal distribution). The random distribution used for each $w_i$ may or may not be the same (e.g., depending on whether it is desired to embed some specific serial number data in the watermark). The watermark vector is then added at step 20 to the string $x_1, x_2, \ldots, x_n$, and the result reinserted at step 22 into the original data to be protected. The work may then be converted back to its original form (image, video, audio, etc.) at step 24.

Figure 2:
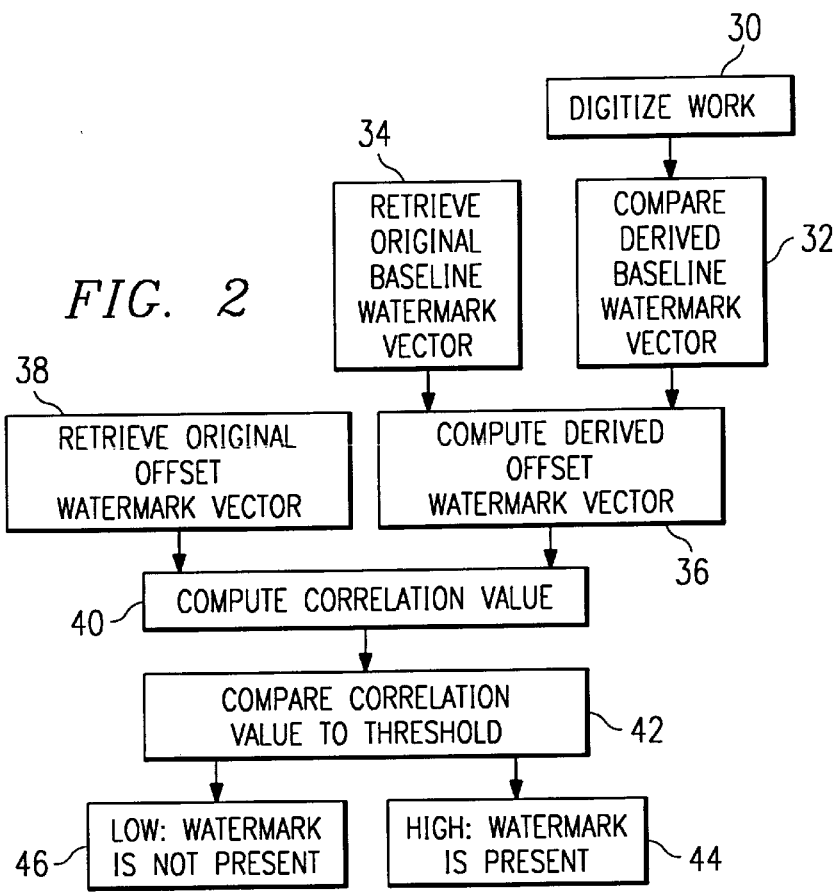
FIG. 2 is a block diagram illustrating the method for retrieving a digital watermark from a copy and correlating the retrieved watermark with a stored watermark.

Assume it is now desired to retrieve the watermark from a copy D'. This can be accomplished, as shown generally in FIG. 2, by digitizing the copy D' at step 30 and then computing at step 32 the derived values $x_1', x_2', \ldots x_n'$, using the same algorithm used to compute the baseline watermark. Then, the method proceeds at step 34 by retrieving the original base line watermark, $x_1, x_2, \ldots x_n$, from memory and subtracting out $x_1, x_2, \ldots x_n$ from $x_1', x_2', \ldots x_n'$ to compute a derived watermark $w_1', w_2', \ldots w_n'$ at step 36. A correlation value (preferably an inner product) is then calculated between the derived watermark and $w_1, w_2, \ldots w_n$, retrieved at step 38, to produce a correlation value at step 40. The correlation value is compared at step 42 to threshold levels, and if the correlation is high (step 44), then there is a match and a watermark is present. If the correlation is low (step 46), the watermark is not present. (The inner product scheme works by computing the absolute value of the sum $w_1 w_1' + \ldots + w_n w_n'$).

This scheme is immune to collusion because the watermark is random and because different watermarks are completely uncorrelated. In existing schemes, different watermarks are highly correlated and so it is easy for an attacker to exploit the correlation to destroy the watermark (e.g., by an averaging attack). In the invention method, there is simply not enough information contained in "t" different watermarked copies of the data in order for the adversary to remove the watermark. More specifically, if the attacker obtains "t" copies of watermarked data using the normal distribution to construct the watermarks (with watermarks $w_{11}, \ldots w_{1n}$, through $w_{t1}, \ldots w_{tn}$), it will appear to the attacker as if the original baseline watermark is $x_1 + (w_{11} + \ldots + w_{1n})/t, \ldots, x_n + (w_{t1} + \ldots + w_{tn})/t$, which is not the true baseline watermark $x_1, \ldots x_n$. The distinction is important since the former string is correlated with each of the watermarks $w_{11} \ldots w_{1n}$ through $w_{t1} \ldots w_{tn}$. In other words, the attacker simply does not have enough information in order to evade the watermark, no matter what sort of attack is used. Hence, one can prove that either the attacker must destroy the data or he must leave a trace of at least one of the component watermarks which will be revealed when the correlation test is run. Only someone with knowledge of the original baseline watermark could remove the watermark without detection.

Therefore, "m" copies of the work include variations of a baseline watermark such that up to "t" persons who possess those copies cannot collude to create a "clean" copy (i.e., one without any watermark whatsoever). Stated another way, any "t" persons who collude in such a manner will always create an illicit copy that includes one of the modified watermarks. Comparison of the watermark of the illicit copy with the baseline watermark then identifies what party made the copy (assuming there is a record of which party originally got which "version").

According to a preferred method, a first digital watermark is inserted in a first copy of a data file, preferably in a critical region of the data. A second digital watermark is then inserted in a second copy of the data file in a similar manner, and the process is repeated for additional copies. As discussed above, the first and second digital watermarks are slight variations of a "baseline" watermark, which is kept secret, and one cannot perceive any differences between the first and second copies due to these variations. Preferably, the variations are "randomized" in such a manner that if two persons were to collude to attempt to create an "illicit" copy of the work (i.e., a copy without a watermark), at least one of the first or second watermarks would still be present in the copy. In the preferred embodiment, a watermark consists of a sequence of numbers $W=w_1, \ldots, w_n$, where each value $w_i$ is chosen independently and approximately according to $N(0,1)$ (where $N(\mu, \sigma_2)$ denotes a normal distribution with mean $\mu$ and variance $\sigma^2$). The watermark may consist of a number (e.g., 1000) of randomly generated numbers with a normal distribution having zero mean and unity variance. Alternatively, $w_i$ could be selected according to $N(\mu_i, \sigma_i)$ where $\mu_1, \ldots, \mu_n$ can be a serial number corresponding to the copy being watermarked (or other information that may be embedded).

In order to detect the presence of a watermark W in a derived watermark signal W', we preferably use a correlation function cor(W,W')=|W·W'|, which is the inner product of two vectors. If W were selected according to the normal N(0,1) distribution and W' is uncorrelated to W (but of the same order), then the correlation will be small (about $\sqrt{n}$). If W' is closely correlated to W then the correlation will be large (about n). If W' is uncorrelated to W but is of a larger order (e.g., due to intentional or unintentional noise or attempts to hide the watermark), then the correlation might also be large. (Specifically, if W' is uncorrelated to W but has B times the magnitude, then the correlation is about B $\sqrt{n}$. If B is large, then the data D' will not resemble D. (The notion of large in this context depends on the application and the level of security/clarity desired). In any event, the watermark is said to be present if cor(W,W')>c $\sqrt{n}$, where c is a predetermined constant that depends on the application and level of security desired (e.g., c=4).

The correlation will be low if the watermark is not present and the work is not destroyed. The correlation will be high if D' was derived from the watermarked document or if the data has been corrupted beyond recognition (the latter condition being determined by inspection).

As noted above, it is preferable that each of the "modified" watermarks be placed in a critical region of the data. Of course, the exact location will depend on the nature of the work being protected. It is also helpful if every entry in this region of data is largely uncorrelated with the other data. It has been suggested (by Cox et al) that this can be accomplished by embedding a watermark in the spectrum of an image, the temporal frequency domain of an audio signal, or the spatio-temporal frequency domain of a video sequence. Although the above techniques are preferred, one may even encode the watermark in other less, desirable places (such as in the low order or least significant bits) of the data and still obtain the advantages of the collusion-resistant feature of the invention where multiple parties may collude to remove the watermark.

Variations

In the embodiment discussed above, the original document (or an original baseline watermark vector) is stored in order to determine whether the watermark is present in a copy of the document. In the embodiment previously described, the original baseline watermark vector is retrieved at step 34 and subtracted from the derived baseline watermark vector to produce the derived offset watermark vector. This step can be omitted without changing the detection protocol or its results. In particular, the derived offset watermark vector may be set equal to the derived baseline watermark vector. This change increases the noise level in the correlation test, but not beyond tolerable levels. Further, the noise levels can be reduced by specially selecting the original offset watermark vectors to have low noise (e.g., by selecting them to be orthogonal to the original baseline watermark vector to which they are being applied) or by running the correlation test on only specific components of the vectors.

Another improvement would be to remove the need to store the original offset watermark vector. As discussed above, in one embodiment of the invention it is necessary to store a copy of the original offset watermark vectors (see, e.g., step 18) so that they can be later retrieved and correlated with the derived offset watermark vectors (see, e.g., step 38). This step can be largely omitted by the following process.

The original offset watermark vectors are computed using a secret random hash function H. The function H maps copyright and other information that the user desires to embed in he document (e.g., "This picture is the property of XYZ Corp., unauthorized copying is forbidden") to the sequence of numbers W=$w_{13}$ 1, . . . , $w_{13}$ n that was used as the original offset watermark vector. The sequence of numbers preferably has same structure and function as discussed above and appear to be random, but the sequence is easily reconstructed given the secret function H and the underlying information to be inserted into the document. Hence, a watermark is identified by reconstructing the original offset watermark vector locally instead of retrieving the vector from a database. More generally, the text to be embedded may be a simple serial number, and this serial number can be retrieved from the document by checking all possibilities to see if there is a correlation. This check can be done locally if H is available, since all relevant original offset vectors can be regenerated as needed.

Thus, according to this variation of the present invention, one need not subtract the original picture before carrying out the dot product form of the correlation test described above in the main embodiment. In such case, the correlation test generates the old dot product (which is large, precisely what is desired) plus the dot product of the offset vector and the original picture. Since the offset vector is random, this dot product is small (in the noise range) for any picture. Therefore, one does not need the original picture to do the correlation test. Moreover, by using the secret random hash function H, one need not store the offset vectors. The function maps a copyright notice or text into a sequence of independent Gaussian offsets (i.e., an offset vector). Then, one may choose the offset vector for some text to be H(text). Now, one need only remember the text, not the whole offset vector. The text may be timestamped so that the same offset vector is only used once, although one can use the same offset vector more than once.

This method is provably secure, even against colluders, but has low memory requirements. A two-tiered version, wherein there are two hash functions (e.g., one for the sign and one for the magnitude of the offsets) might be used as well. In this way, one of the two (sign or magnitude) would be kept in reserve and not released, even in the secure software. More generally, a series of different watermarks might be used and released according to different purposes. For example, a "Do not copy" watermark might be used where the author is not seeking to restrict "access" whereas a "Do not access" watermark might be used where the author desires to receive payment before access is allowed. Alternatively, a series of watermarks may be used to restrict the number of accesses.

Another two-tiered approach involves one level of watermark that may be somewhat easy to detect without knowing any secret key and another level that is much more secure but requires a secret key or other secret information to detect.

The above-described variants can be combined advantageously to provide a scheme to prevent unauthorized copying of certain media such as CD's and VCR videos. In this application, a given text—such as "Do not copy"—is used as the watermark. A VCR can then check for the presence of this watermark before allowing the copying to take place. This would be achieved by having the secret function H embedded in the VCR software or hardware in a secure fashion, e.g., through a secure chip or via a protected software encryption scheme. The value of H would also be embedded securely in the hardware or software that generates the watermarked copy in the first place instance.

In the VCR/CD application, it may only be necessary to use a single watermark for many copies of the document, in which case it may only be necessary to use a single watermark offset vector (e.g., H ("Do not copy")) for different documents. In this variant, the system must be secure against a different kind of collusion; namely, one in which the same watermark is used with different documents instead of the case where the same document is used with different watermarks. Fortunately, the same analysis applies to both scenarios equally well, such that either scheme is secure against collusion.

In the above-described variant, the hardware/software that creates the watermarks is in secure hands (so that H remains secret and cannot be misused). For example, if the adversary is allowed to watermark a blank document, then the scheme can lose security. There are several ways, however, that security can be enhanced as is now explained.

In one approach, it is assumed that each copy of the watermarking software produces watermarks unique to the copy. For example, the XYZ Corporation watermarking software produces watermarks of the form H(XYZCORP|Do not copy). Then, only the watermarks produced by that software would be compromised if the XYZ software were stolen. (For simplicity, each version of the software could be the same except for a special key unique to the version.) Alternatively, the original offset watermark vectors can be derived as a function of the document that is being watermarked in addition to the text that is being embedded into the document. This has the effect of making watermarks corresponding to "Do not copy" be different for each document in which they appear. For example, one might use $H(x_{13} 1 \ldots X_{13} n |\text{Do not copy})$ as the original offset watermark vector for a document with features $x_{13} 1, \ldots, x_{13} n$ into which the "Do not copy" text is embedded. Even further, the string $x\_1, \ldots, x_{13} n$ may include random numbers so that offset vectors can be further differentiated in an effort to prevent attacks.

In order to confirm the presence of a watermark in the preceding examples, one still needs to know (or guess, perhaps by exhaustive search) the underlying text that was used to generate the original offset vector. This process can be simplified by embedding serial numbers instead of text. Once the serial number is retrieved, a global database is consulted to find out what the text is. However, it is still necessary to be careful how a serial number is embedded since exhaustive search over a space of 12-digit numbers would be costly and difficult. In such a case, it would be much better to separately embed say four (4) serial numbers, each with 3 digits. (Of course, such numbers and their characteristics are merely exemplary). Then, one would only have to search over a space of 1000 numbers (instead of 1,000,000,000,000 numbers) four times. (This technique makes use of the fact that the watermarking procedures can be used to embed more than one watermark in a document.) One watermark could be used for each decimal or letter in a serial number. As a specific example, if a given letter of a serial number is "a", and this letter appears in the third position of the number, then the watermark could be a random string computed by generating a hash H(3,a). Alternatively, the H(a) could be used to generate the watermark, which would then be placed in the third component of the picture.

It is also possible to make the watermarking process more resilient to noise as well as more secure. This is achieved as follows.

Suppose that one desires to embed the text "Do not copy" in a document. Another good way of doing this is to embed multiple offset watermark vectors in the document. For example, we could use $H(y_{13} 1|\text{Do not copy}), H(y_{13} 2|\text{Do not copy}), \ldots, H(y\_m |\text{Do not copy})$ for different values of $y\_1, \ldots, y\_m$ as the vectors. If any of the watermarks is detected, then copying would not proceed. Such a scheme is more robust since all m vectors would have to be ruined by noise or be removed by an adversary before copying could proceed. If there is a chance p of being able to remove any one of the vectors, then the change of losing all m is $p^m$ (assuming independence), which is very small (e.g., if $p=0.01$ and $m=4$, then $p^m=10^{-8}$).

There are several multiple watermarks can be embedded in the document. One method would be to combine the multiple watermarks with the same baseline watermark vector, e.g., by simply adding them all together. Alternatively, each watermark vector could be used with a different baseline vector, e.g., when each watermark is placed in a different component of the document.

Additional variants of the present invention are now described. One variation requires a user to have a password before being able to read or process a document. In particular, when the watermark is generated by a hash function, such as H(XYZCORP|Do not copy), the watermark may be of the form H(password ** required for access), where ** is the password. In this case, processing of the document is allowed only if the watermark is detected (as opposed to the case when processing is not allowed when a watermark is detected). In this alternate embodiment, the user needs to know the password in order for the watermark (which depends on the password) to be detected.

Yet another variant facilitates tracing of the history of a document. In particular, whenever a person touches or possesses a document, a watermark is added to the document with the ID of that person. In this way, if the document is released illegally, the last person to touch or possess the document can be determined. Moreover, each time a watermark is added, one could also add a timestamp to determine the last possessor's identity.

Another variant is a method to reduce noise in the correlation test (previously described) to thereby decrease the occurrence of false positives and false negatives when checking for a watermark. In this embodiment, some normalization on the baseline watermark and/or the offset watermark is carried out. For example, if the ith component of the baseline watermark $x\_i$ is replaced by $x\_i+w\_i$ in the watermarked document, then the procedure involves several steps that are now described:

(1) The routine computes basic statistics (such as average value and standard deviation) for each $x\_i$. This can be done by generating $x\_i$ for an ensemble of documents and taking the mean and standard deviation of the observed values. It could also be done by generating $x\_i$ for the single work being protected but from different portions or manifestations of the work. (For example, with a movie, one could compute values for $x\_i$ by looking over several frames; with a picture, one could look over several portions of the picture.)

(2) Modify $x\_i$ and $w\_i$ by normalizing with respect to the statistics. If one computed the mean of $x\_i$, then the routine would subtract this value from the actual $x\_i$. If one computed the standard deviation, then the routine would divide this value into the actual $x\_i$. Alternatively, one could multiply the standard deviation times $w\_i$. More generally, the watermark value can be scaled by an amount derived from analysis of other pictures or regions of the picture being watermarked.

The above processing is useful because it helps all values in the correlation test have substantially equal magnitude and therefore noise (or a particular error) cannot get too much weight.

(3) A further variation is to draw the normalization values from the document itself. This is especially useful in audio or movie applications where one can nearly deduce the original baseline watermark values $x\_i$ from the document without having to look them up in a database (because there are often many frames in a movie that are nearly identical). Once one has an approximation to $x\_i$, this approximation can be subtracted before the correlation test is performed (as previously described). In other words, the document contains redundant information that can be used to regenerate the baseline watermark so that it can be subtracted (but without having to look it up in a database).

Thus, one can watermark each frame of a movie separately. To check for a watermark in one frame, one can use the previous frame in place of the original when checking for the watermark, e.g. subtract the previous frame (instead of the original, which is not necessarily available) before doing the correlation test. More generally, this technique can be used whenever one has available a copy of the image that is similar to the original but not identical to the watermarked copy being evaluated.

The present invention also contemplates further variants and/or modifications, which are now also described. One of the features of the invention described above involves adding the watermark vector to the baseline watermark. Although this is desirable, instead of merely adding the watermark vector to the baseline watermark, a more complicated combination may be done. In particular, instead of $x\_i+w\_i$, one might compute $x\_i(1+w\_i)$. More generally, one can replace $x\_i$ by a function $f\_i(X,W)$. It is also practicable to use scaling, e.g., multiplying the value of $w\_i$ by a scalar so that the intensity of the watermark can be adjusted.

Further, the approach of using a watermarked copy of the original image in place of the original image during a correlation test (for a different watermark) can also be used to protect the original image after the test is run. For example, consider the following scenario. An author/creator of a photograph finds a copy of his or her work posted on the World Wide Web, the Internet's multimedia information retrieval system. Assume that the author now desires to prove that it carries one of the author's watermarks. One could reveal the original picture to a judge (or whomever is checking the claim), who would then subtract it from the watermarked copy and run a correlation test with the alleged watermark. The problem with this approach is that the judge has a copy of the original picture without the watermark. If this copy is stolen, the evaluation cannot be run since the copy does not carry a watermark. However, one could improve the process by giving the judge a copy of the image with a different watermark. This image is very close to the original; thus, it will be sufficient for the judge's purposes. Release of the original picture (i.e., without the author's consent), however, will be avoided.

The approach in the previous example can be carried further in ways that should be especially valuable for the "Do not copy" application. As previously described, a secure memory may be used to store or compute the watermark corresponding to "Do not copy." Indeed, all known schemes need to have the watermark that is being checked remain secret. This is because once you have the watermark, it is easy to remove it (e.g., subtract it from the watermarked copy to obtain a clean copy). Unfortunately, the correlation test needs to know the watermark in order to run the correlation test. That is why secure hardware in VCR (for example) is used. However, one can overcome the need for the secure hardware as follows.

Suppose one wants to test for a watermark vector w in a document X'. In the original procedure, one would process X' and then run a correlation test (e.g., by computing the dot product w * X'). If w was present in X', then the correlation would be high. In the alternative embodiment now described, one does not release w at all. Rather, (w+w')/2 is released and the correlation is run against (w+w')/2, where w' is another watermark vector. Because watermark vectors can be made to appear random, it is not possible for an adversary to learn anything about w from seeing (w+w')/2. However, the correlation test will be positive if and only if w was present. The result of the test will be weaker by a factor of 2, but this is well within tolerance.

In summary, it is possible to run the correlation test without revealing information about the watermark vector, because the watermark vector is "masked" before it is released. The masked watermark vector will still perform well in the correlation test. This idea can be extended by providing each VCR with a different masking of the "Do not copy" watermark vector. Thus if one VCR is compromised, it will not help the adversary remove the watermark for any other VCR. In fact, if the adversary uses his knowledge of (w+w')/2 to modify his picture so that the correlation test with (w+w')/2 is negative (which he can only do by subtracting a multiple of this vector from the image), he will have unwittingly embedded the new watermark w' in the picture (and he will not have removed the original watermark w). Thus, not only will the original watermark still be present, but there will be proof that the adversary tried to cheat; further, the party will know which VCR was opened for this purpose.

The "Do not copy" text described above is not meant to be taken by way of limitation. Depending on the particular application, other warning(s) can be used, such as "Do not allow access", "Do not allow access unless a password is given", "Do not allow processing", or variations and/or combinations of the above.

As discussed above, it has been suggested that the watermark be placed in a critical region of the data, e.g., in a spatio-temporal frequency domain of the work. One particular advantageous method for achieving this would be use of a spectral transform (e.g., the discrete cosine transform (DCT) or other transforms) to form the baseline watermark of the data. A "critical region" is a region that, if destroyed, would result in serious degradation of the data.

I claim:

1. A method of copy protection for a document, comprising the steps of:

generating a first digital string from the document to form a baseline watermark;

generating a second digital string from given text;

generating a watermark having a predetermined relationship to the first and second digital strings; and inserting the watermark into the document to protect the document against illicit copying.

2. The method of copy protection as described in claim 1 further including the steps of:

retrieving a derived watermark from the document to form a third digital string;

generating a fourth digital string from the given text;

running a correlation test between the third and fourth digital strings; and if the third and fourth digital strings have a predetermined correlation, generating an indication that the given text is present in the document.

3. The method as described in claim 1 wherein the given text includes a copy prohibition.

4. The method as described in claim 1 wherein the given text is a serial number.

5. The method as described in claim 1 wherein the second and fourth digital strings are generated using a secret hash function whose output is a string of pseudorandom numbers.

6. An access control method, comprising the steps of:
during a watermarking phase:
generating a first digital string from an object sought to be protected to form a baseline watermark;
generating a second digital string from given text;
generating a watermark having a predetermined relationship to the first and second digital strings; and
inserting the watermark into the object to protect access to the object;
upon an access request:
retrieving a derived watermark from the object to form a third digital string;
generating a fourth digital string from the given text;
correlating the third and fourth digital strings; and
if the third and fourth digital strings have a predetermined correlation, authorizing access to the object.

7. The method as described in claim 6 wherein the given text is a password.

8. The method as described in 6 wherein the second and fourth digital strings are generated using a secret hash function.

9. A method of watermarking an object, comprising the steps of:
generating a first digital string from the object to form a baseline watermark;
generating a second digital string from given text providing an indication that a first action with respect to the object is allowed and a second action with respect to the object is prohibited;
generating a watermark having a predetermined relationship to the given text and the second digital string; and
inserting the watermark into the object.

10. The method as described in claim 9 wherein the first action is copying the object and the second action is accessing the object.

11. The method as described in claim 9 wherein the first action is accessing the document and the second action is copying the object.

12. The method as described in claim 9 wherein the second digital string is generated using a random hash function whose output is a string of pseudorandom numbers.

13. The method as described in claim 9 wherein the object is a document.

14. The method as described in claim 9 wherein the object is an audiovisual work.

15. A method for determining whether an object has a given watermark, comprising the steps of:
processing the object to generate a data string;
correlating the data string with a value that is a function of the given watermark and a second watermark such that information useful in determining the given watermark cannot be obtained from the value; and
if the data string and the value correlate to a predetermined extent, indicating that the object has been watermarked with the given watermark.

16. The method as described in claim 15 wherein the function is an average of the given watermark and the second watermark.

17. A method for determining whether a document has a given watermark vector embedded therein, comprising the steps of:
processing the document to generate a data string;
correlating the data string with a value that is a function of the given watermark vector and a second watermark, wherein the second watermark masks information about the given watermark;
accepting the document as including the given watermark vector if the data string and the value correlate to a predetermined extent.

18. The method as described in claim 17 wherein the function is an average of the given watermark vector and the second watermark.

19. A access protection method operative in a device having means for outputting given content, comprising the steps of:
retrieving a derived watermark and a derived signal from the given content;
generating a digital string from the derived signal using a secure hash function;
correlating the derived watermark and the digital string; and
based on a result of the correlating step, taking a given action.

20. The access protection method as described in claim 19 wherein the given action includes the step of allowing the given content to be accessed if the derived watermark and the digital string correlate to the predetermined degree.

21. The access protection method as described in claim 19 wherein the given action includes the step of denying access to the given content if the derived watermark and the digital string correlate to the predetermined degree.

22. The access protection method as described in claim 21 wherein the device is a player and the given content is an audiovisual work.

23. A method for authorizing access to given content that has a given watermark embedded therein, comprising the steps of:
processing the given content to generate a first data string;
generating a second data string by applying a given function to the first data string;
correlating the first and second data strings; and
if the first and second data strings correlate to a given degree, providing a password to enable further processing of the given content.

24. The method as described in claim 23 wherein the further processing includes viewing the given content.

25. The method as described in claim 23 wherein the further processing includes copying the given content.

26. A method for computing a derived watermark, comprising the steps of:
processing a given work W to form a first data string $x_1, x_2, \ldots x_n$,
processing a collection C of works to form a second data string $y_1, y_2, \ldots y_n$; and
computing the derived watermark $z_1, z_2, \ldots z_n$ by applying a given function $f(x_i, y_i)$.

27. The method as described in claim 26 wherein $f(x_i, y_i)$ is equal to $(x_i - y_i)$.

28. The method as described in claim 26 wherein $f(x_i, y_i)$ is equal to $(x_i/y_i)$.

29. The method as described in claim 26 wherein the collection C of works consists of the work W.

30. The method as described in claim 26 wherein the work W is an video work having a plurality of frames, the first data string is derived from a first frame of the video work, and the second data string is derived from a second frame of the video work.

31. A method of access control for a document, comprising the steps of:

generating a first digital string from the document to form a baseline watermark;

generating a second digital string from given text;

generating a set of watermarks each having a predetermined relationship to the first and second digital strings; and inserting the set of watermarks into the document to protect the document against illicit use.

32. The method as described in claim 31 further including the step of, at a subsequent time, processing the document to determine whether any of the set of watermarks are present.

33. The method as described in claim 32 further including the step of authorizing access to the document if at least a given number of the set of watermarks are present.

34. The method as described in claim 32 further including the step of authorizing access to the document if at most a given number of the set of watermarks are present.

35. The method as described in claim 31 wherein one of the set of watermarks is generated at a different time than at least one other of the set of watermarks.

36. A method for detecting a watermark in a document using information that, if disclosed, does not compromise security of the document, comprising the steps of:

processing the document to generate a data string;

correlating the data string with the information; and accepting the document as including the watermark if the data string and the information correlate to a predetermined extent.

37. The method as described in claim 36 wherein the processing step includes digitizing the document and the information is an average of the watermark and a second watermark.

* * * * *